(12) United States Patent
Al Daif

(10) Patent No.: US 12,221,858 B2
(45) Date of Patent: Feb. 11, 2025

(54) METHOD AND SYSTEM FOR MANAGING VALVES IN AN OIL AND GAS WELL

(71) Applicant: SAUDI ARABIAN OIL COMPANY, Dhahran (SA)

(72) Inventor: Mohammed Y. Al Daif, Al Qatif (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 743 days.

(21) Appl. No.: 17/471,600

(22) Filed: Sep. 10, 2021

(65) Prior Publication Data

US 2023/0078738 A1  Mar. 16, 2023

(51) Int. Cl.
  *E21B 34/16* (2006.01)
  *H04L 9/40* (2022.01)
  *H04L 67/12* (2022.01)
  *H04N 7/18* (2006.01)

(52) U.S. Cl.
  CPC ............ *E21B 34/16* (2013.01); *H04L 63/102* (2013.01); *H04L 67/12* (2013.01); *H04N 7/185* (2013.01)

(58) Field of Classification Search
  CPC .......... E21B 34/16; E21B 44/00; G06F 21/31; G06Q 10/06; H04L 63/08
  See application file for complete search history.

(56) References Cited

U.S. PATENT DOCUMENTS

| | | | |
|---|---|---|---|
| 9,235,838 B2 * | 1/2016 | Gerardi | G06Q 20/38215 |
| 9,671,794 B1 | 6/2017 | Lymberopoulos et al. | |
| 10,000,704 B2 | 6/2018 | Young et al. | |
| 10,590,752 B2 | 3/2020 | Al-Gouhi et al. | |
| 10,815,739 B2 | 10/2020 | Lovell et al. | |
| 10,890,060 B2 * | 1/2021 | Jorud | E21B 41/0021 |

(Continued)

FOREIGN PATENT DOCUMENTS

| | | |
|---|---|---|
| EP | 2 159 370 A2 | 3/2010 |
| WO | 2011/071479 A1 | 6/2011 |

(Continued)

OTHER PUBLICATIONS

Office Action issued by Saudi Arabian Patent Office for corresponding Saudi Patent Application No. 122440186, mailed Sep. 29, 2024 (9 pages).

*Primary Examiner* — Tara Schimpf
*Assistant Examiner* — Ursula Lee Norris
(74) *Attorney, Agent, or Firm* — Osha Bergman Watanabe & Burton LLP

(57) ABSTRACT

A method may include determining, using a user credential, that a user associated with a user device is authorized to operate a predetermined valve at a well. The method may further include obtaining, from the user device, a request to operate the predetermined valve. The method may further include determining that no users are located within a predetermined valve area proximate the predetermined valve using image data. The image data may be obtained from a camera device in the predetermined valve area. The method may further include determining that no obstacles are present inside the predetermined valve area based on well operation data. The method may further include transmitting a command to a control system coupled to the predetermined valve, where the command causes the control system to operate the predetermined valve.

17 Claims, 6 Drawing Sheets

(56) References Cited

U.S. PATENT DOCUMENTS

| | | | |
|---|---|---|---|
| 2016/0053542 A1* | 2/2016 | Stafford | E21B 33/14 |
| | | | 175/69 |
| 2016/0363917 A1 | 12/2016 | Blackley | |
| 2019/0101907 A1 | 4/2019 | Charr et al. | |
| 2020/0105082 A1 | 4/2020 | Joao | |
| 2020/0362670 A1 | 11/2020 | Alanazi et al. | |
| 2024/0288166 A1* | 8/2024 | Khan | F23N 5/242 |
| 2024/0309741 A1* | 9/2024 | Greska | E21B 34/02 |

FOREIGN PATENT DOCUMENTS

| | | |
|---|---|---|
| WO | 2014/036133 A1 | 3/2014 |
| WO | 2018/183543 A9 | 8/2019 |

* cited by examiner

METHOD AND SYSTEM FOR MANAGING VALVES IN AN OIL AND GAS WELL

BACKGROUND

A well system may include various flow control devices, such as valves, for managing fluids entering and leaving a well. Depending on an operation being performed at a well, some valves may be open and other valves may be closed. As conditions change at a well, human personnel may determine different valve configurations for managing different flows within the well. In a well emergency, for example, one or more safety valves may be triggered to prevent injury to well personnel and well equipment at the well.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, embodiments relate to a method that includes determining, by a well valve manager and using a user credential, that a user associated with a user device is authorized to operate a predetermined valve at a well. The well valve manager obtains the user credential over a well network from the user device. The method further includes obtaining, by the well valve manager and from the user device, a request to operate the predetermined valve. The request is transmitted to the well valve manager in response to a user input within a graphical user interface at the user device. The method further includes determining, automatically by the well valve manager, that no users are located within a predetermined valve area proximate the predetermined valve using image data. The image data is obtained from a camera device in the predetermined valve area. The method further includes determining, automatically by the well valve manager, that no obstacles are present inside the predetermined valve area based on well operation data. The well operation data is obtained by the well valve manager from one or more control systems performing a well operation at the well. The method further includes transmitting, by the well valve manager, a command to a control system coupled to the predetermined valve, wherein the command causes the control system to operate the predetermined valve.

In general, in one aspect, embodiments relate to a system that includes various control systems at a well including a wellbore. The system further includes a user device and a well valve manager that includes a computer processor and is coupled to the control systems and the user device. The well valve manager obtains, from the user device and over a well network, a user credential. The well valve manager determines, using the user credential, that a user associated with the user device is authorized to operate a predetermined valve at the well. The well valve manager obtains, from the user device, a request to operate the predetermined valve. The request is transmitted to the well valve manager in response to a user input within a graphical user interface at the user device. The well valve manager determines that no users are located within a predetermined valve area proximate the predetermined valve using image data. The image data is obtained from a camera device in the predetermined valve area. The well valve manager determines automatically that no obstacles are present inside the predetermined valve area based on well operation data. The well operation data is obtained by the well valve manager from the control systems performing a well operation at the well. The well valve manager transmits a command to a control system coupled to the predetermined valve. The command causes the control system to operate the predetermined valve.

In general, in one aspect, embodiments relate to a non-transitory computer readable medium storing instructions executable by a computer processor. The instructions determine, using a user credential, that a user associated with a user device is authorized to operate a predetermined valve at a well. The instructions further obtain, from the user device, a request to operate the predetermined valve. The request is obtained in response to a user input within a graphical user interface at the user device. The instructions determine automatically that no users are located within a predetermined valve area proximate the predetermined valve using image data. The image data is obtained from a camera device in the predetermined valve area. The instructions determine automatically that no obstacles are present inside the predetermined valve area based on well operation data. The well operation data is obtained by the well valve manager from one or more control systems performing a well operation at the well. The instructions further transmit a command to a control system coupled to the predetermined valve. The command causes the control system to operate the predetermined valve.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

Figure 1:
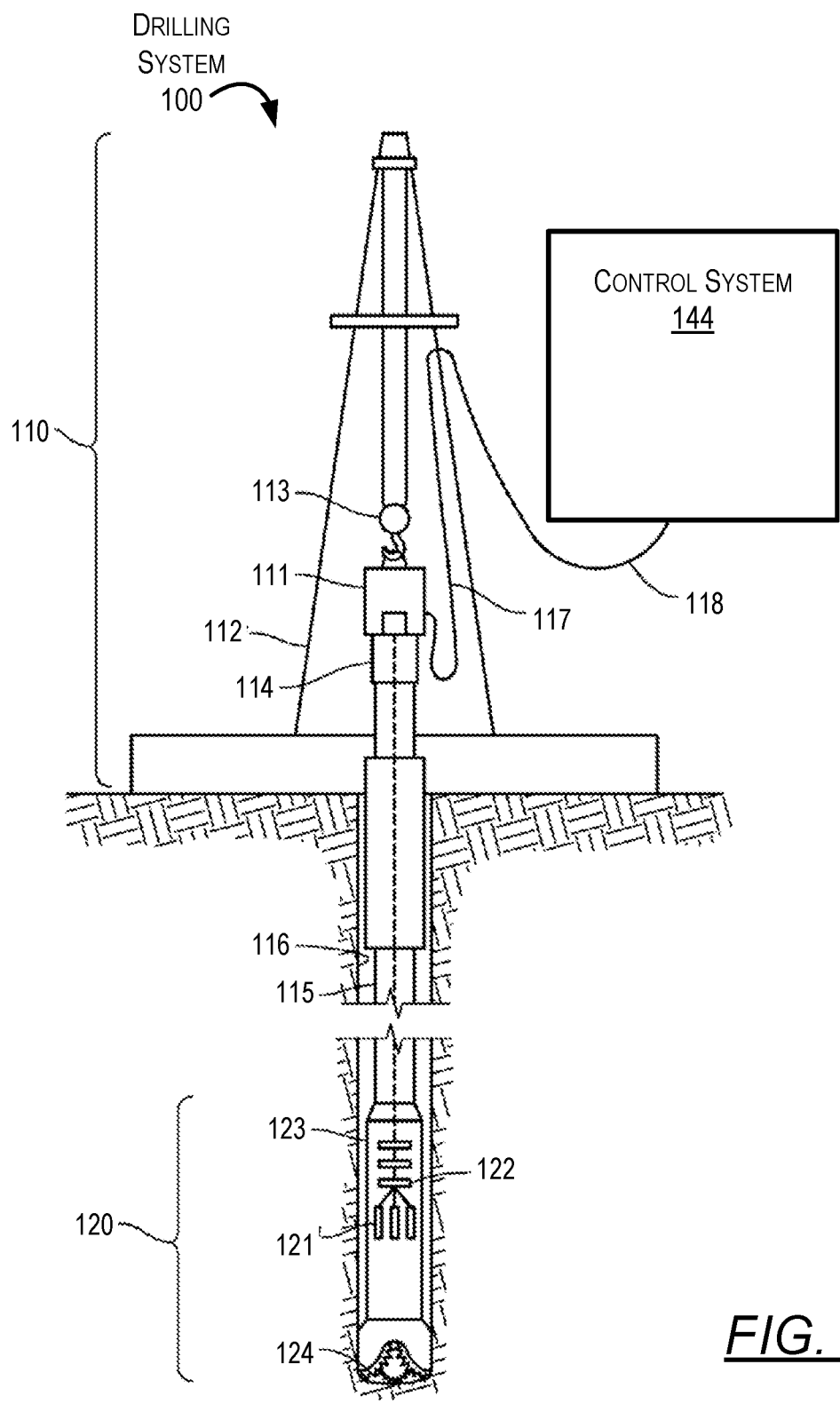
FIGS. 1 and 2 show systems in accordance with one or more embodiments.

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.)

may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In general, embodiments of the disclosure include systems and methods for managing various valves in a well using a well valve manager in connection with a graphical user interface provided for well personnel. In some embodiments, a well valve manager may collect data throughout a well network, such as image data regarding valve areas, valve data regarding current valve states, well operation data regarding ongoing well operations (e.g., drilling operations and flowback operations), and other data. The well valve manager may present this information in a panel for use in managing valve operations remotely. However, different users may have different levels of access for operating valves. For example, a user may provide user credentials, such as a password or a card scan, to access various valve privileges associated with the user for operating valves. A well valve manager may analyze these user credentials to determine which valves may be adjusted by the user as well as which valve data may be presented to the user.

Based on conditions at the well, a well valve manager may also adjust operating privileges (e.g., in a well emergency, any user may operate all valves at a well site). In a flowback operation, for example, a flowback human operator may obtain access for opening and closing all valves in a well system, while these valve privileges may be denied other users temporarily. Once the flowback operation ends, users may have their previous valve privileges returned accordingly. As such, a well valve manager may be connected in real-time to various control systems at a well site for managing valve access rights.

Furthermore, multiple valves may be operated by several well personnel during drilling operations, well testing operations, and flowback operations, to direct the flow direction of various fluids. For example, valve panels may be distributed across a well site and at remote locations to allow easy access and immediate action in case of a well emergency. Unfortunately, valve panels may be operated by any personnel on the field. If not operated properly by only authorized users, valve changes in a well system may lead to catastrophic results. For illustration purposes, improperly changing a valve state may result in opening a valve that is preventing hydrocarbon from entering surface lines. In addition, some valve closures may lead to damaging the valve if the operation was perform while an object or obstacle is across the valve. Thus, some embodiments may enhance safety during well operations and preventing equipment failures by preventing unauthorized users from operating valves around a well site.

In some embodiments, a well valve manager may automatically prevent closing valves across obstacles being used in well operations. By having real-time data regarding ongoing well operations, a well valve manager may prevent certain valve operations while certain well operations, such as coiled tubing operations, slickline operations, or wireline operations, are being performed at a well. For example, a drillstring or a workstring may be obstructing one or more valves during a particular operation. The well valve manager may also be connected to various camera devices proximate different valve areas to provide visual confirmation on possible valve issues. In some embodiments, the well valve manager provides a graphical user interface that presents a schematic view demonstrating various valve conditions in different valve areas before and after operating one or more valves. The well valve manager may also be linked to various gauges around a well (e.g., to identify trap pressures and valve leaks) and other sensors to obtain an accurate picture of issues relating to valve operations. In some embodiments, a well valve manager generates one or more log reports regarding valve operations.

Turning to FIG. 1, FIG. 1 shows a drilling system (100) that may include a top drive drilling rig (110) arranged around the setup of a drill bit logging tool (120). A top drive drilling rig (110) may include a top drive (111) that may be suspended in a derrick (112) by a travelling block (113). In the center of the top drive (111), a drive shaft (114) may be coupled to a top pipe of a drill string (115), for example, by threads. The top drive (111) may rotate the drive shaft (114), so that the drill string (115) and a drill bit logging tool (120) cut the rock at the bottom of a wellbore (116). A power cable (117) supplying electric power to the top drive (111) may be protected inside one or more service loops (118) coupled to a control system (144). As such, drilling mud may be pumped into the wellbore (116) through a mud line, the drive shaft (114), and/or the drill string (115).

The control system (144) may include one or more programmable logic controllers (PLCs) that include hardware and/or software with functionality to control one or more processes performed by the drilling system (100) or another system (e.g., a well completion system or well intervention system). Specifically, a programmable logic controller may control valve states, fluid levels, pipe pressures, warning alarms, and/or pressure releases throughout a drilling rig. In particular, a programmable logic controller may be a ruggedized computer system with functionality to withstand vibrations, extreme temperatures, wet conditions, and/or dusty conditions, for example, around a drilling rig or another well site. For example, the control system (144) may be coupled to the sensor assembly (123) in order to perform various program functions for up-down steering and left-right steering of the drill bit (124) through the wellbore (116). While one control system is shown in FIG. 1, the drilling system (100) may include multiple control systems for managing various well drilling operations, maintenance operations, well completion operations, and/or well intervention operations.

The wellbore (116) may include a bored hole that extends from the surface into a target zone of the hydrocarbon-bearing formation, such as the reservoir. An upper end of the wellbore (116), terminating at or near the surface, may be referred to as the "up-hole" end of the wellbore (116), and a lower end of the wellbore, terminating in the hydrocarbon-bearing formation, may be referred to as the "down-hole" end of the wellbore (116). The wellbore (116) may facilitate the circulation of drilling fluids during well drilling operations, the flow of hydrocarbon production ("production") (e.g., oil and gas) from the reservoir to the surface during production operations, the injection of substances (e.g., water) into the hydrocarbon-bearing formation or the reservoir during injection operations, or the communication of monitoring devices (e.g., logging tools) into the hydrocarbon-bearing formation or the reservoir during monitoring operations (e.g., during in situ logging operations).

As further shown in FIG. 1, sensors (121) may be included in a sensor assembly (123), which is positioned adjacent to a drill bit (124) and coupled to the drill string (115). Sensors (121) may also be coupled to a processor assembly (123) that includes a processor, memory, and an analog-to-digital converter (122) for processing sensor measurements. For example, the sensors (121) may include acoustic sensors, such as accelerometers, measurement microphones, contact microphones, and hydrophones. Likewise, the sensors (121) may include other types of sensors, such as transmitters and receivers to measure resistivity, gamma ray detectors, etc. The sensors (121) may include hardware and/or software for generating different types of well logs (such as acoustic logs or sonic longs) that may provide well data about a wellbore, including porosity of wellbore sections, gas saturation, bed boundaries in a geologic formation, fractures in the wellbore or completion cement, and many other pieces of information about a formation. If such well data is acquired during well drilling operations (i.e., logging-while-drilling), then the information may be used to make adjustments to drilling operations in real-time. Such adjustments may include rate of penetration (ROP), drilling direction, altering mud weight, and many others drilling parameters.

In some embodiments, acoustic sensors may be installed in a drilling fluid circulation system of a drilling system (100) to record acoustic drilling signals in real-time. Drilling acoustic signals may transmit through the drilling fluid to be recorded by the acoustic sensors located in the drilling fluid circulation system. The recorded drilling acoustic signals may be processed and analyzed to determine well data, such as lithological and petrophysical properties of the rock formation. This well data may be used in various applications, such as steering a drill bit using geosteering, casing shoe positioning, etc.

Furthermore, various types of well operations may be performed at a well site. In addition to drilling operations, well operations may include well completion operations, flowback operations, construction operations, and production operations. Production operations include the final stage in preparing a well where production flow normalizes and the well produces consistently with substantially constant downhole pressure.

When completing a well, for example, one or more well completion operations may be performed prior to delivering the well to the party responsible for production or injection. Well completion operations may include hydraulic stimulations operations, such as hydraulic fracturing. Well completion operations may also include casing operations, cementing operations, perforating the well, gravel packing, directional drilling, hydraulic and acid stimulation of a reservoir region, and/or installing a production tree or wellhead assembly at the wellbore (116). Likewise, well operations may include open-hole completions or cased-hole completions. For example, an open-hole completion may refer to a well that is drilled to the top of the hydrocarbon reservoir. Thus, the well is cased at the top of the reservoir, and left open at the bottom of a wellbore. In contrast, cased-hole completions may include running casing into a reservoir region. Cased-hole completions are discussed further below with respect to perforation operations.

Well construction operations may include installation of well equipment that may be needed for production, such as storage tanks, separators, and interconnecting piping. In one well operation example, the sides of the wellbore (116) may require support, and thus casing may be inserted into the wellbore (116) to provide such support. After a well has been drilled, casing may ensure that the wellbore (116) does not close in upon itself, while also protecting the wellstream from outside incumbents, like water or sand. Likewise, if the formation is firm, casing may include a solid string of steel pipe that is run on the well and will remain that way during the life of the well. In some embodiments, the casing includes a wire screen liner that blocks loose sand from entering the wellbore (116).

In another well operation example, a space between the casing and the untreated sides of the wellbore (116) may be cemented to hold a casing in place. This well operation may include pumping cement slurry into the wellbore (116) to displace existing drilling fluid and fill in this space between the casing and the untreated sides of the wellbore (116). Cement slurry may include a mixture of various additives and cement. After the cement slurry is left to harden, cement may seal the wellbore (116) from non-hydrocarbons that attempt to enter the wellstream. In some embodiments, the cement slurry is forced through a lower end of the casing and into an annulus between the casing and a wall of the wellbore (116). More specifically, a cementing plug may be used for pushing the cement slurry from the casing. For example, the cementing plug may be a rubber plug used to separate cement slurry from other fluids, reducing contamination and maintaining predictable slurry performance. A displacement fluid, such as water, or an appropriately weighted drilling fluid, may be pumped into the casing above the cementing plug. This displacement fluid may be pressurized fluid that serves to urge the cementing plug downward through the casing to extrude the cement from the casing outlet and back up into the annulus.

Keeping with well operations, some embodiments include perforation operations. More specifically, a perforation operation may include perforating casing and cement at different locations in the wellbore (116) to enable hydrocarbons to enter a wellstream from the resulting holes. For example, some perforation operations include using a perforation gun at different reservoir levels to produce holed sections through the casing, cement, and sides of the wellbore (116). Hydrocarbons may then enter the wellstream through these holed sections. In some embodiments, perforation operations are performed using discharging jets or shaped explosive charges to penetrate the casing around the wellbore (116).

In another well operation, a filtration system may be installed in the wellbore (116) in order to prevent sand and other debris from entering the wellstream. For example, a gravel packing operation may be performed using a gravel-packing slurry of appropriately sized pieces of coarse sand or gravel. As such, the gravel-packing slurry may be pumped into the wellbore (116) between a casing's slotted liner and the sides of the wellbore (116). The slotted liner and the gravel pack may filter sand and other debris that might have otherwise entered the wellstream with hydrocarbons.

In some embodiments, well intervention operations may include various operations carried out by one or more service entities for an oil or gas well during its productive life (e.g., fracking operations, CT, flow back, separator, pumping, wellhead and Christmas tree maintenance, slickline, wireline, well maintenance, stimulation, braded line, coiled tubing, snubbing, workover, subsea well intervention, etc.). For example, well intervention activities may be similar to well completion operations, well delivery operations, and/or drilling operations in order to modify the state of a well or well geometry. In some embodiments, well intervention operations provide well diagnostics, and/or manage the production of the well. With respect to service entities, a service entity may be a company or other actor that performs one or more types of oil field services, such as well operations, at a well site. For example, one or more service entities may be responsible for performing a cementing operation in the wellbore (116) prior to delivering the well to a producing entity.

Turning to flowback operations, a flowback operation may include opening a well and managing volatility associated with initial production. In a flowback operation, flowback fluid (also called "flowback water") may be allowed to flow from the well following a completion treatment (e.g., for preparation on another well completion operation or prior to cleanup and entering production). After casing is cemented in the well and piping and other well equipment are installed, a flowback operation may be performed. Fluid produced during flowback may include a mixture of crude oil, natural gas, water, and sand. Here, well personnel may attempt to keep a well open in order to normalize production. For example, fluid may initially flows through a wellbore and through a wellhead assembling (e.g., a "Christmas tree") into various separators. As flowback may be a very volatile stage, downhole pressure may be high. Thus, flowback operations may include specific field professional who specialize in troubleshooting equipment during flowback operations.

During flowback operations and other well operations, high fluid levels and fluid pressure may pose dangers to field personnel and well equipment. For example, valves and their valve trim (e.g., operating parts of a valve that are exposed to fluid, such as stems, plugs, discs, seating surface etc.) may be damaged by high fluid pressures, erratic liquid levels, and various erosive materials in the fluid such as sand that corrode and wear out valves and other equipment. Valves in particular may be susceptible to damage that requires repair or replacement during a flowback operation. Likewise, changing compositions in well fluid may require changes in liquid levels in various well equipment, such as separators. Thus, a flowback personnel may have to shut-in one or more vessels periodically during a flowback operation.

Figure 2:
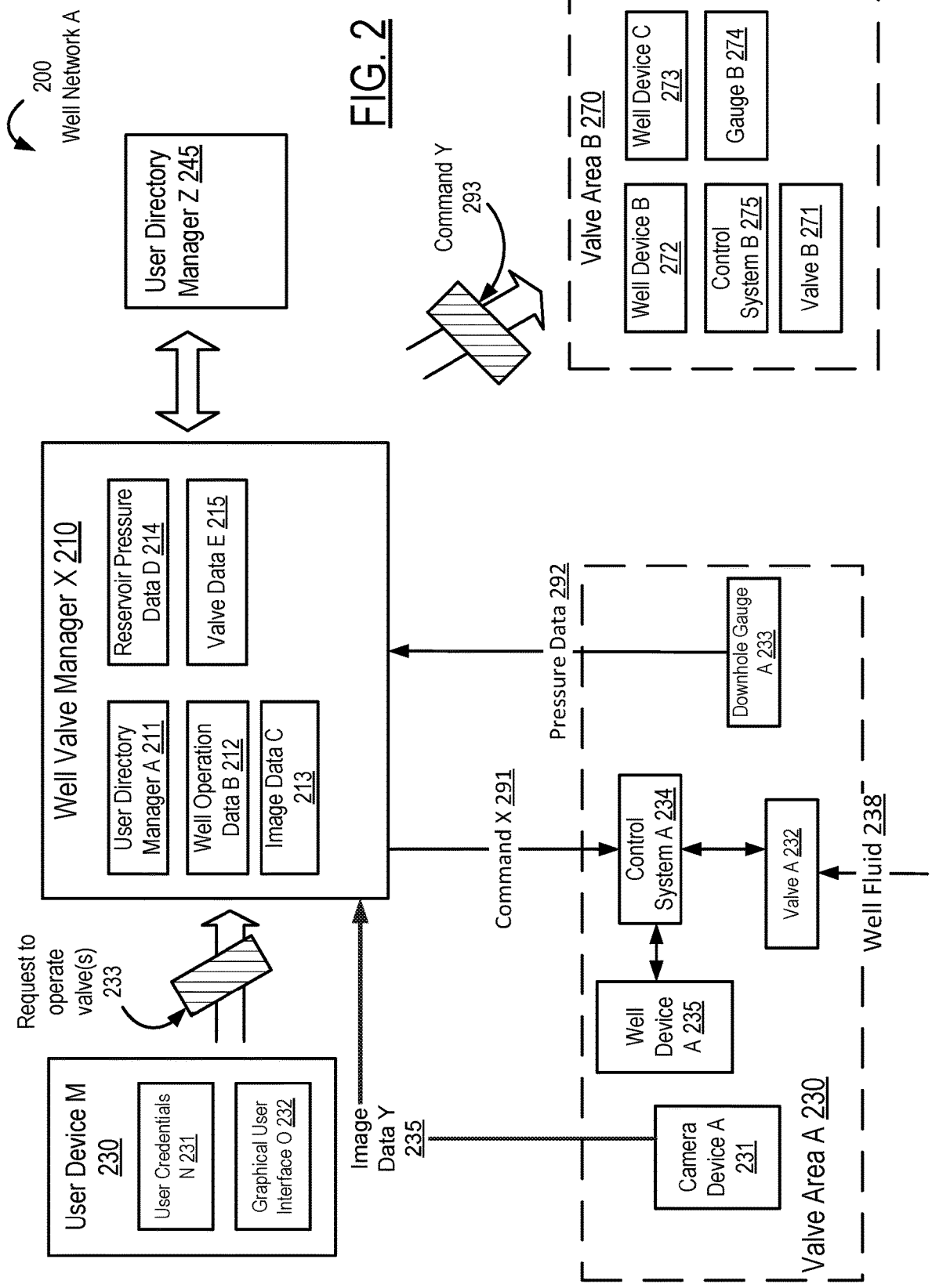

Turning to FIG. 2, FIG. 2 shows a schematic diagram in accordance with one or more embodiments. As shown in FIG. 2, well network (e.g., well network A (200)) may include various valve areas (e.g., valve area A (230)), various control systems (e.g., control system A (234), control system B (275)), various user devices (e.g., user device M (230)), various network elements (such as routers, access points, switches, etc.), well equipment (e.g., well device A (235), well device B (272), well device C (273)), and/or a well valve manager (e.g., valve manager X (210)). A valve area may include one or more valves (e.g., valve A (232) in valve area A (230) or valve B (271) in valve area B (270)) and one or more gauges (e.g., gauge A (233) gauge B (274)) in a predetermined area around a well site. For example, a wellbore may be divided into multiple valve areas that include various downhole safety valves, wellhead valves, and/or internal control valves for performing well operations. In some embodiments, a valve area includes one or more camera devices (e.g., camera device A (231)) for monitoring the valve area. The well network may include well devices (such as separators, pipe sections, mud pumps, etc.) in a well system, such as a well completion system or drilling system that is similar to drilling system (100) described above in FIG. 1 and the accompanying description. User devices may include personal computer, smartphones, tablets, human machine interfaces (HMIs), and/or a computer system (502) described below in FIG. 5 and the accompanying description.

In some embodiments, a well valve manager (e.g., well valve manager X (210)) is coupled to one or more control systems (e.g., control system A (234), control system B (275)) at a wellsite. In some embodiments, a well valve manager may be a software-defined controller or a hardware controller that includes hardware and/or software for collecting well operation data (e.g., well operation data B (212)), valve data (e.g., valve data E (215)), reservoir pressure data (e.g., pressure data (292) from downhole pressure gauge A (233), reservoir pressure data D (214)), and image data (e.g., image data C (213), image data Y (235)) regarding one or more valve areas. Well operation data may describe one or more well operations being perform at a well site, such as drilling operation data, well completion data, well stimulation data, flowback data, etc. Valve data may describe the state of one or more valves in a well network, such as which valves are open, which valves are closed, which valves have fluid (e.g., well fluid (238)) passing through them, and condition data regarding the valves (e.g., degree of erosion, valve temperature, valve pressure, valve history, etc.). Reservoir pressure data may describe pressure conditions downhole in a well, such as high pressure conditions during a flowback operation. Image data may include picture data and/or video data regarding a scene around a valve or other well equipment. In some embodiments, the well valve manager X (210) may include a computer system that is similar to the computer system (502) described below with regard to FIG. 5 and the accompanying description. Likewise, the well valve manager may be a cloud server located remotely from a well site.

In some embodiments, a well valve manager provides one or more user interfaces (e.g., graphical user interface O (232)) to monitor various valve areas and/or valves throughout a well network. Valves may be monitored by a camera, where image data may be processed at an edge that indicates a position of one or more valves. For example, a well valve manager may enhance the safety of one or more well operation using a valve panel at a well site that shows various valve areas and their corresponding components. Accordingly, the user interface may present valve data, well operation data, reservoir pressure data or other pressure data regarding valves, and image data to various user devices.

In particular, a well valve manager may implement different levels of authorization and access using a valve panel for operating different valves. During a flowback operation, for example, a flowback human operator may have the highest level of access to operate any valves in a well network, such as downhole safety valves in a wellbore. However, some well personnel may need to operate valves for well equipment at a well surface or for tasks separate from the flowback operation. Thus, a well valve manager may implement access levels for different users based on assigned tasks, assigned roles in a well operation or at the well site, and other access criteria. For example, a user may be assigned different time periods for performing different well tasks. During the user's specified time period, the user may operate one or more valves associated with his well tasks, but may not operate the valves outside the specified time period or valves unrelated to such tasks. In some embodiments, a well valve manager includes functionality for automatically changing access levels for one or more valves. During a flowback emergency, for example, a well valve manager may restrict access to all valves except for the flowback human operator. Likewise, the well valve manager may also disable all restrictions in a well emergency, so that any user may operate any valves in a well network.

In some embodiments, a well valve manager analyzes one or more user credentials (e.g., user credentials N (231)) to determine whether to operate one or more valves. For example, a user device may transmit a request to operate a valve (e.g., request to operate one or more valves (233)) with one or more user credentials. The user device may transmit user identification with a password to the well valve manager. Likewise, a user device may scan a user's ID to obtain user credential for determine access for operating a valve. Furthermore, a user device may be connected to a well valve manager over a network connection. For example, a user device may transmit user credentials and requests to operate valves over a WiFi connection, thereby allowing a remote activation from the user device.

In some embodiments, a well valve manager communicates with a user directory manager (e.g., user directory manager A (211), user directory manager Z (245)) to determine valve access rights within a well system. For example, a user directory manager may include hardware and/or software with functionality to manage permissions and access to network resources within a network. More specifically, the user directory manager may store user information as objects in a database operated by a user directory manager. An object may be a single element, such as a user, group, application or device (e.g., an operator workstation). Moreover, a user directory manager may include a set of processes and services implemented on a local server or a remote server that authenticates users and devices in the network. For example, a user directory manager may be a domain controller that assigns and enforces various security policies for a computer network domain, such as through validating user credentials (e.g., passwords and user identifications, such as login IDs), user types (e.g., a normal user, a system administrator, etc.), and/or privilege levels (e.g., by specifying which control systems may be accessed by a particular user or user device). In some embodiments, the user directory manager uses a Lightweight Directory Access Protocol (LDAP) for directory services authentication and communication with a well valve manager. An example of a user directory manager may be an Active Directory® server. Once a user directory manager verifies user credentials with respect to a predetermined time period for accessing one or more control systems, the user directory manager may transmit an access confirmation to a well valve manager. In particular, the access confirmation may be a network message that identifies one or more parameters (e.g., time duration, level of control system privileges, etc.) of a user session for a user and/or user device for accessing one or more control systems.

Turning to valves, a well network may include one or more types of valves coupled to one or more well assemblies. For example, a valve may include hardware that opens and closes various fluid lines in order to control and direct fluids between well assemblies, such as a pump assembly. Likewise, valves may operate using multiple valve states, such as different degrees of being open or closed. Examples of valves may include downhole control valves, solenoid valves, shuttle valves, ball valves, internal control valves, such as reactive-actionable valves, plug valves, bellow-sealed valves, and other types of valves. A downhole control valve may be valve that include a computer-controlled valve or actuator that is opened and closed using commands (e.g., command X (291), command Y (293)), such as from a control system or a well valve manager. For example, a downhole control valve may operate based on an input from an outside control signal. Solenoid valves may be electromechanically operated valves that open, close, distribute or mix a fluid in a pipe based on a predetermined strength of a generated magnetic field. A safety valve may be a downhole device that isolates wellbore pressure and fluids, e.g., in an emergency event of an emergency or in response to a failure of well equipment. A safety valve may include a fail-safe mode, such that an interruption or malfunction of a particular well process may result in the safety valve closing. Internal control valves include valves that automatically or in response to remote commands implement valve states with predetermined valve positions, e.g., a specific choke position to satisfy a particular parameter for a well operation. Thus, various valve types may be specified based on function, actuation-type, and/or size. Plug valves may be valves that include functionality for rotating a plug inside the valve body to start or stop a fluid flow through the valve. As such, plug valves may be conical or have a cylindrically-tapered shape. Bellow-sealed valves may provide an axial movement, such as at the valve's stem. Ball valves may be used for various fluid isolation applications. Gate valves may have a disk that is completely or partially removed when the gate valve opens, allowing fluid to pass through the gate valve.

Figure 3A:
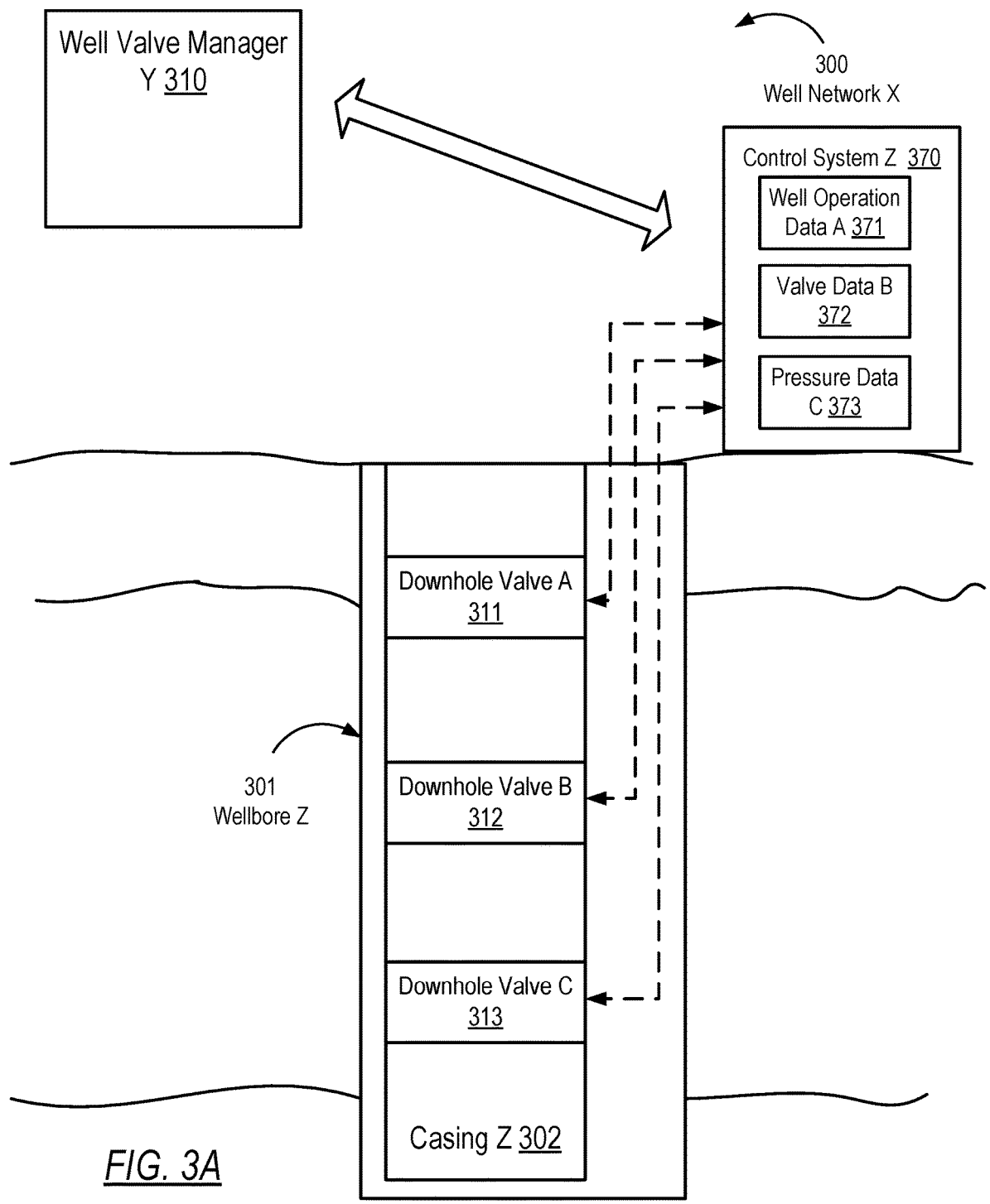
FIGS. 3A and 3B show an example in accordance with one or more embodiments.
Figure 3B:
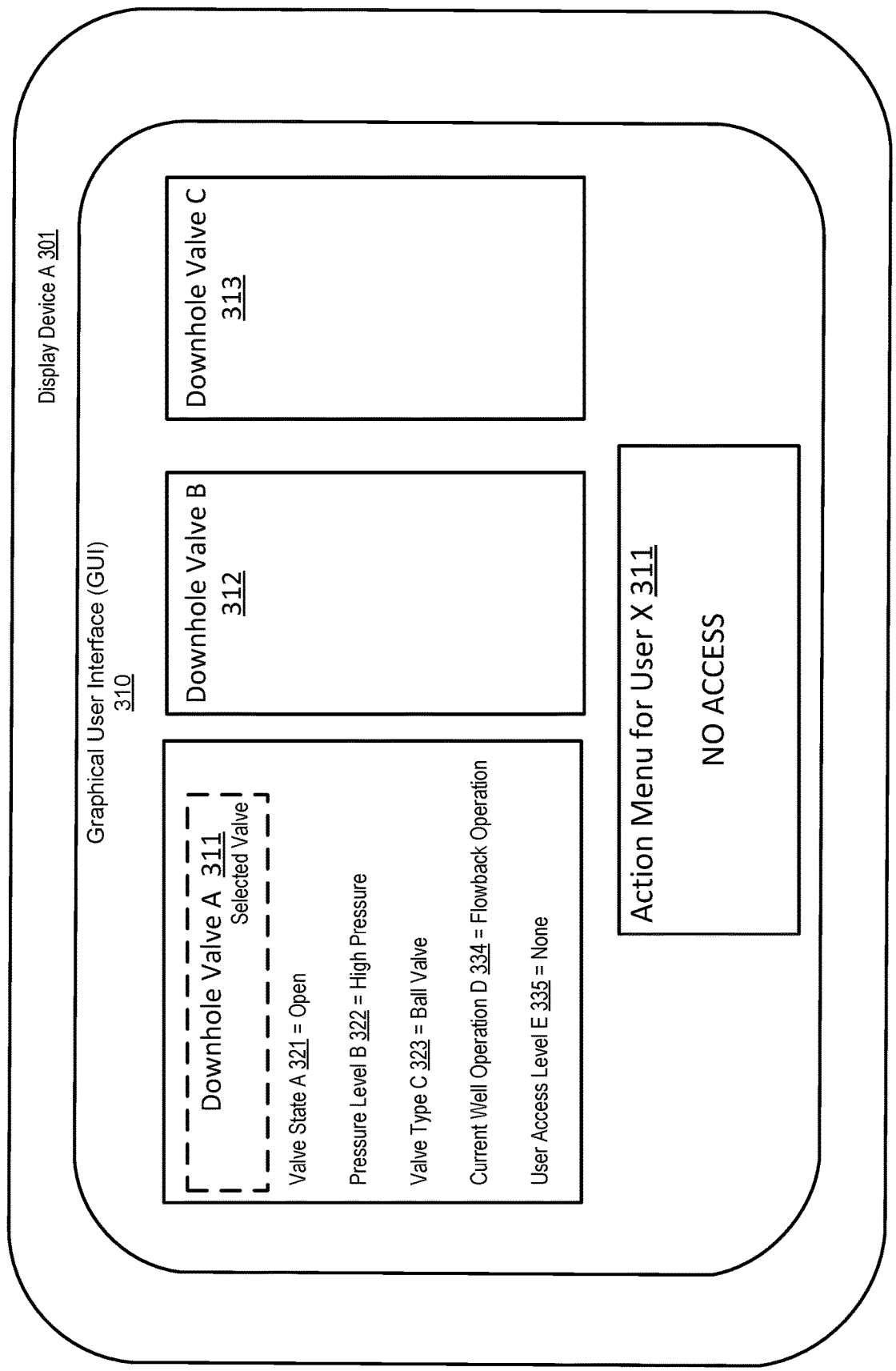

Turning to FIGS. 3A and 3B, FIGS. 3A and 3B provide an example of managing valves in accordance with one or more embodiments. The following example is for explanatory purposes only and not intended to limit the scope of the disclosed technology. As shown in FIG. 3A, a well network X (300) includes a cloud server that hosts a well valve manager Y (310) that is coupled to a control system Z (370) over the Internet. The control system Z (370) stores well operation data A (371), valve data B (372), and pressure data C (373), and is coupled to various downhole valves, i.e., downhole valve A (311), downhole valve B (312), downhole valve C (313) within a casing Z (302) in wellbore Z (301). Accordingly, the control system Z (370) communicates data regarding valves and valve areas to the well valve manager Y (310), while also receiving commands for the downhole valves (311, 312, 313), e.g., from the well valve manager Y (310).

Turning to FIG. 3B, a graphical user interface (GUI) (310) may be provided by the well valve manager Y (310) using a display device A (301) of a user device (not shown). Here, the GUI (310) may provide information regarding various downhole valves based on a particular valve selection. For example, a user X may select downhole valve A (311), which subsequently populates the GUI (310) with information regarding downhole valve A (311), such as a valve state A (321), a pressure level B (322), a valve type C (323). The GUI (310) also provide information regarding a current well operation D (334) as well as a user access level E (335) for the user X. However, because the user X is not allowed to operate downhole valve A (311), the action menu (311) provides no available operations associated with the valve. If the user X did have user access, the action menu (311) may provide various commands for operating the downhole valve A (311).

While FIGS. 1, 2, and 3 shows various configurations of components, other configurations may be used without departing from the scope of the disclosure. For example, various components in FIGS. 1, 2, and 3 may be combined to create a single component. As another example, the functionality performed by a single component may be performed by two or more components.

Figure 4:
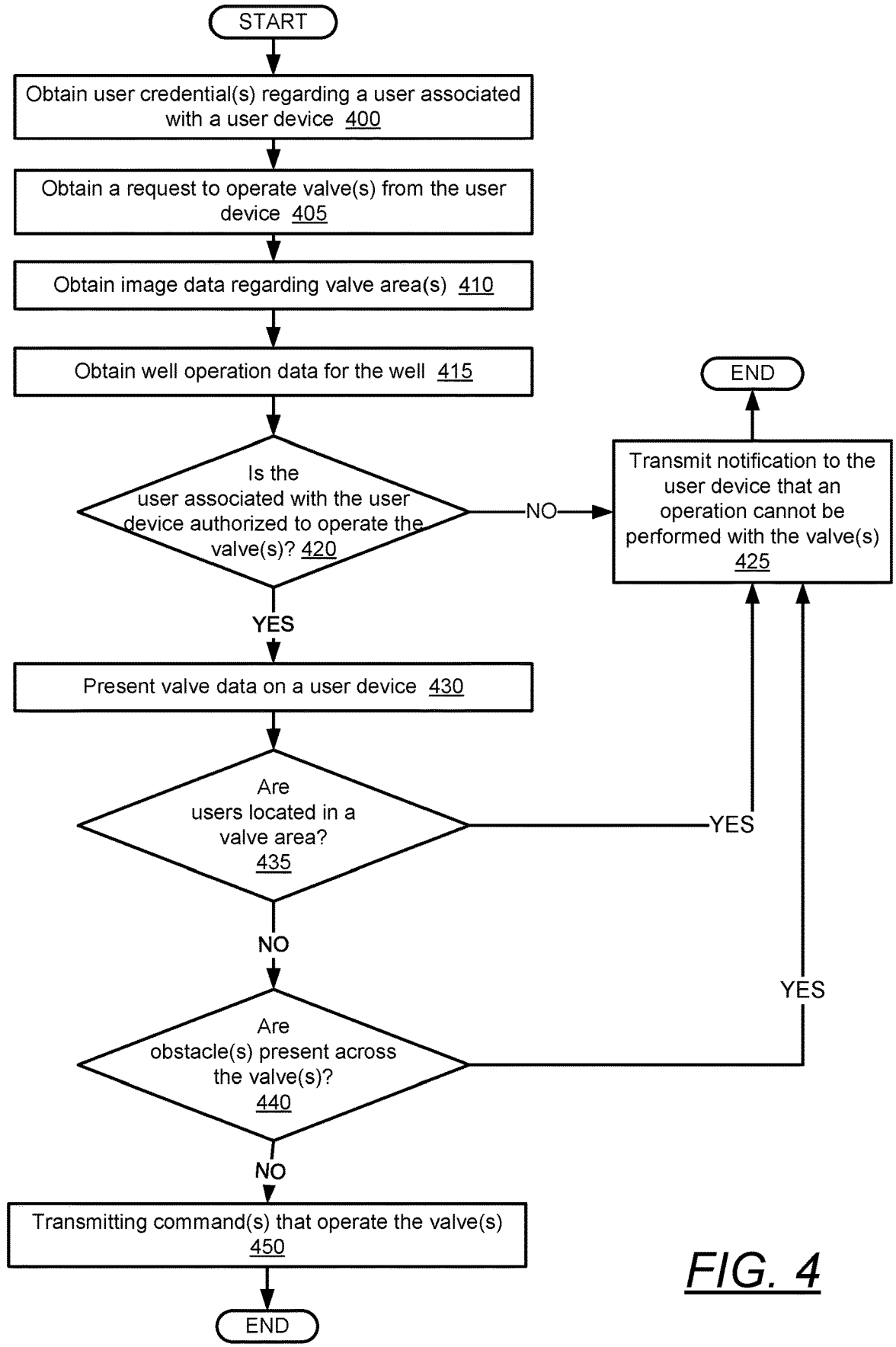
FIG. 4 shows a flowchart in accordance with one or more embodiments.

Turning to FIG. 4, FIG. 4 shows a flowchart in accordance with one or more embodiments. Specifically, FIG. 4 describes a general method for managing valves within a well system in accordance with one or more embodiments. One or more blocks in FIG. 4 may be performed by one or more components (e.g., well valve manager X (210)) as described in FIGS. 1, 2, 3A, and 3B. While the various blocks in FIG. 4 are presented and described sequentially, one of ordinary skill in the art will appreciate that some or all of the blocks may be executed in different orders, may be combined or omitted, and some or all of the blocks may be executed in parallel. Furthermore, the blocks may be performed actively or passively.

In Block 400, one or more user credentials are obtained regarding a user associated with a user device in accordance with one or more embodiments. In particular, a well valve manager may only allow authorized users to access valves or valve data. Authorization may be based on static user rights (e.g., a user X may have access to change valve states for valves A, D, and F, but not valves B, C, or E). In some embodiments, authorization may be associated with an ongoing well operation. For example, once a flowback operation is initiated, certain users may be assigned access rights to various valves, while all other users may be denied access privileges. Once the flowback operation ends, access rights may be returned to users based on their regular privileges. In some embodiments, a well valve manager communicates with a user directory manager to determine what level of authorization is associated with a user or user device.

In Block 405, a request is obtained from a user device to operate one or more valves at a well in accordance with one or more embodiments. For example, a user may transmit a request in response to a user input in a user device. The request may be a network message transmitted between a user device and a well valve manager that identifies a desire for a user session to access valve data for one or more valves in a well system. On the other hand, a request may also be a network message specific to one or more valves, which may include a desired to adjust one or more current valve states. For example, a request may be a message from a user to open valve A and close valve B.

In Block 410, image data are obtained regarding one or more valve areas in accordance with one or more embodiments. A well valve manager may collect image data from various valve areas in real-time to present within a graphical user interface, e.g., for authorized users to observe visual information regarding different valves.

In Block 415, well operation data are obtained for a well in accordance with one or more embodiments. For example, a well valve manager may receive information from control systems regarding ongoing well operations. Likewise, the well operation data may also be provided by one or more user devices (e.g., a user device may transmit a signal to a well valve manager that a flowback operation has been initiated).

In Block 420, a determination is made whether a user is associated with a user device authorized to operate one or more valves in accordance with one or more embodiments. For example, a well valve manager may analyze with access rights are associated with a particular user based on the user access credentials. Where a determination is made that a user or user device is not authorized to operate one or more valves, the process may proceed to Block 425. Where a determination is made that the user or the user device is authorized to operate one or more valves, the process may proceed to Block 430.

In Block 425, a notification is transmitted to a user device that an operation cannot be performed with one or more valves in accordance with one or more embodiments. For example, a notification may be presented in a user device that a specific user lacks authorization privileges to access a GUI provide by a well valve manager or lacks authorization to adjust valve states for one or more valves. Likewise, the notification may also describe conditions regarding a valve that prevent access, e.g., a particular valve is associated with an ongoing flowback operations, which prevents access to the user device at the present time.

In Block 430, valve data are presented on a user device in accordance with one or more embodiments. For example, a graphical panel may be provided that enables visualization of various valve positions, pressure gauges readings, and other relevant data, such as the safety conditions at various valve areas and ongoing well operations. The valve data may also present images of various valve areas based on image data collected by a well valve manager.

In Block 435, a determination is made whether any users are located in a valve area in accordance with one or more embodiments. In some embodiments, a well valve manager may determine using image data whether any well personnel are disposed in any valve areas. For example, the valve area may be a flaring area, where flaring gas from a flare device may pose a significant danger to nearby personnel in the valve area. Thus, a well valve manager may automatically override a request to operate a valve where a present danger exists to well personnel even where a user has authorization to operate a valve. Where a determination is made that no users are located in a valve area, the process may proceed to Block 440. Where a determination is made that at least one user is located in the valve area, the process may proceed to Block 425.

In Block 440, a determination is made whether one or more obstacles are present across one or more valves in accordance with one or more embodiments. Similar to Block 435, a well valve manager may automatically analyze data (e.g., image data, valve data, work operation data, etc.) at one or more valve areas whether any obstacles (such as temporary well equipment or downhole well conditions) that prevent valve operations or provide a risk of damaging well equipment in response to opening or closing a valve. For example, a testing string or a workstring may be disposed in a wellbore that prevents one or more downhole valves from closing. Where a determination is made that no obstacles are located in a valve area, the process may proceed to Block 450. Where a determination is made that at least one obstacle is located in the valve area, the process may proceed to Block 425.

In Block 450, one or more commands are transmitted to one or more valves in accordance with one or more embodiments. After determining that no technical issues exist with changing a valve state, a requested valve operation may be performed using one or more commands. For example, a well valve manager may transmit a command to a control system to operate a particular valve.

Figure 5:
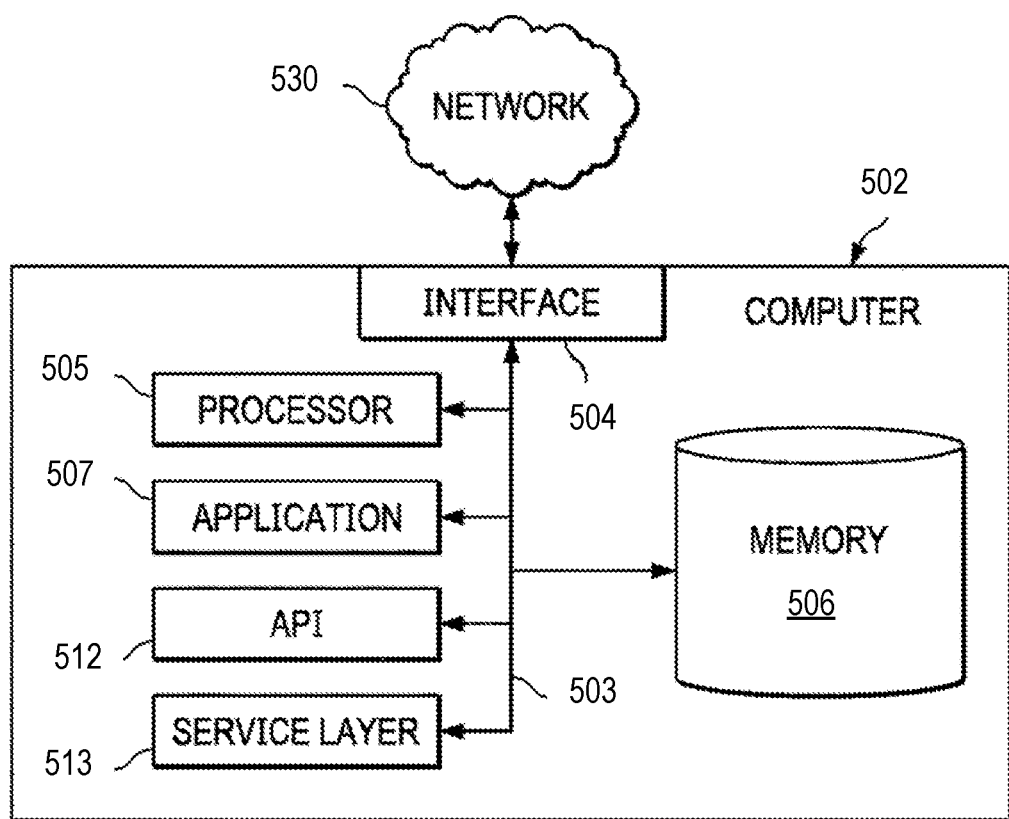
FIG. 5 shows a computer system in accordance with one or more embodiments.

Embodiments may be implemented on a computer system. FIG. 5 is a block diagram of a computer system (502) used to provide computational functionalities associated with described algorithms, methods, functions, processes, flows, and procedures as described in the instant disclosure, according to an implementation. The illustrated computer (502) is intended to encompass any computing device such as a high performance computing (HPC) device, a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (502) may include a computer that includes an input device, such as a keypad, keyboard, touch screen, or other device that can accept user information, and an output device that conveys information associated with the operation of the computer (502), including digital data, visual, or audio information (or a combination of information), or a GUI.

The computer (502) can serve in a role as a client, network component, a server, a database or other persistency, or any other component (or a combination of roles) of a computer system for performing the subject matter described in the instant disclosure. The illustrated computer (502) is communicably coupled with a network (530). In some implementations, one or more components of the computer (502) may be configured to operate within environments, including cloud-computing-based, local, global, or other environment (or a combination of environments).

At a high level, the computer (502) is an electronic computing device operable to receive, transmit, process, store, or manage data and information associated with the described subject matter. According to some implementations, the computer (502) may also include or be communicably coupled with an application server, e-mail server, web server, caching server, streaming data server, business intelligence (BI) server, or other server (or a combination of servers).

The computer (502) can receive requests over network (530) from a client application (for example, executing on another computer (502)) and responding to the received requests by processing the said requests in an appropriate software application. In addition, requests may also be sent to the computer (502) from internal users (for example, from a command console or by other appropriate access method), external or third-parties, other automated applications, as well as any other appropriate entities, individuals, systems, or computers.

Each of the components of the computer (502) can communicate using a system bus (503). In some implementations, any or all of the components of the computer (502), both hardware or software (or a combination of hardware and software), may interface with each other or the interface (504) (or a combination of both) over the system bus (503) using an application programming interface (API) (512) or a service layer (513) (or a combination of the API (512) and service layer (513). The API (512) may include specifications for routines, data structures, and object classes. The API (512) may be either computer-language independent or dependent and refer to a complete interface, a single function, or even a set of APIs. The service layer (513) provides software services to the computer (502) or other components (whether or not illustrated) that are communicably coupled to the computer (502). The functionality of the computer (502) may be accessible for all service consumers using this service layer. Software services, such as those provided by the service layer (513), provide reusable, defined business functionalities through a defined interface. For example, the interface may be software written in JAVA, C++, or other suitable language providing data in extensible markup language (XML) format or other suitable format. While illustrated as an integrated component of the computer (502), alternative implementations may illustrate the API (512) or the service layer (513) as stand-alone components in relation to other components of the computer (502) or other components (whether or not illustrated) that are communicably coupled to the computer (502). Moreover, any or all parts of the API (512) or the service layer (513) may be implemented as child or sub-modules of another software module, enterprise application, or hardware module without departing from the scope of this disclosure.

The computer (502) includes an interface (504). Although illustrated as a single interface (504) in FIG. 5, two or more interfaces (504) may be used according to particular needs, desires, or particular implementations of the computer (502). The interface (504) is used by the computer (502) for communicating with other systems in a distributed environment that are connected to the network (530). Generally, the interface (504 includes logic encoded in software or hardware (or a combination of software and hardware) and operable to communicate with the network (530). More specifically, the interface (504) may include software supporting one or more communication protocols associated with communications such that the network (530) or interface's hardware is operable to communicate physical signals within and outside of the illustrated computer (502).

The computer (502) includes at least one computer processor (505). Although illustrated as a single computer processor (505) in FIG. 5, two or more processors may be used according to particular needs, desires, or particular implementations of the computer (502). Generally, the computer processor (505) executes instructions and manipulates data to perform the operations of the computer (502) and any algorithms, methods, functions, processes, flows, and procedures as described in the instant disclosure.

The computer (502) also includes a memory (506) that holds data for the computer (502) or other components (or a combination of both) that can be connected to the network (530). For example, memory (506) can be a database storing data consistent with this disclosure. Although illustrated as a single memory (506) in FIG. 5, two or more memories may be used according to particular needs, desires, or particular implementations of the computer (502) and the described functionality. While memory (506) is illustrated as an integral component of the computer (502), in alternative implementations, memory (506) can be external to the computer (502).

The application (507) is an algorithmic software engine providing functionality according to particular needs, desires, or particular implementations of the computer (502), particularly with respect to functionality described in this disclosure. For example, application (507) can serve as one or more components, modules, applications, etc. Further, although illustrated as a single application (507), the application (507) may be implemented as multiple applications (507) on the computer (502). In addition, although illustrated as integral to the computer (502), in alternative implementations, the application (507) can be external to the computer (502).

There may be any number of computers (502) associated with, or external to, a computer system containing computer (502), each computer (502) communicating over network (530). Further, the term "client," "user," and other appropriate terminology may be used interchangeably as appropriate without departing from the scope of this disclosure. Moreover, this disclosure contemplates that many users may use one computer (502), or that one user may use multiple computers (502).

In some embodiments, the computer (502) is implemented as part of a cloud computing system. For example, a cloud computing system may include one or more remote servers along with various other cloud components, such as cloud storage units and edge servers. In particular, a cloud computing system may perform one or more computing operations without direct active management by a user device or local computer system. As such, a cloud computing system may have different functions distributed over multiple locations from a central server, which may be performed using one or more Internet connections. More specifically, cloud computing system may operate according to one or more service models, such as infrastructure as a service (IaaS), platform as a service (PaaS), software as a service (SaaS), mobile "backend" as a service (MBaaS), serverless computing, artificial intelligence (AI) as a service (AIaaS), and/or function as a service (FaaS).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, any means-plus-function clauses are intended to cover the structures described herein as performing the recited function(s) and equivalents of those structures. Similarly, any step-plus-function clauses in the claims are intended to cover the acts described here as performing the recited function(s) and equivalents of those acts. It is the express intention of the applicant not to invoke 35 U.S.C. § 112(f) for any limitations of any of the claims herein, except for those in which the claim expressly uses the words "means for" or "step for" together with an associated function.

What is claimed:

1. A method, comprising:
    determining, by a well valve manager and using a first user credential, that a first user associated with a first user device is authorized to operate a first predetermined valve at a well, wherein the well valve manager obtains the first user credential over a well network from the first user device;
    obtaining, by the well valve manager and from the first user device, a first request to operate the first predetermined valve, wherein the first request is transmitted to the well valve manager in response to a user input within a graphical user interface at the first user device;
    determining, automatically by the well valve manager, whether or not any users are located within a first predetermined valve area proximate the first predetermined valve using first image data, wherein the first image data is obtained from a first camera device in the first predetermined valve area;
    determining, automatically by the well valve manager, whether or not an obstacle is present inside the first_predetermined valve area based on first well operation data, wherein the first well operation data is obtained by the well valve manager from a first control system performing a first well operation at the well;
    determining, automatically by the well valve manager, whether or not a workstring is disposed inside the first predetermined valve area that prevents the first predetermined valve from closing based on second well operation data, wherein the second well operation data is obtained from a second control system;
    transmitting, to the first user device and in response to determining that the workstring is disposed inside the first predetermined valve area, a notification that the first user cannot close the first predetermined valve, wherein the notification is displayed in a graphical user interface on the first user device; and
    transmitting, by the well valve manager in response to determining that the workstring is not disposed inside the first predetermined valve area, determining that no obstacle is present inside the first predetermined valve area, and determining that that no users are located within the first predetermined valve area proximate the first predetermined valve based on the first image data, the first well operation data and the second well operation data, a command to a third control system coupled to the first predetermined valve, wherein the command causes the third control system to close the first predetermined valve.

2. The method of claim 1, further comprising:
    obtaining, by the well valve manager and from a second user device associated with a second user, a second request to operate a second predetermined valve in the well;
    obtaining a second user credential for a second user associated with the second user device, wherein the second user credential is transmitted to the well valve manager with the second request;
    determining, by the well valve manager and using a user directory manager, whether a second user associated with a second user device is authorized to operate the second predetermined valve; and
    transmitting, to the second user device, a notification that the second user cannot operate the second predetermined valve in response to determining that the second user is not authorized.

3. The method of claim 2,
    wherein the second predetermined valve is a downhole control valve.

4. The method of claim 1,
    wherein the first well operation is a flowback operation, and
    wherein the first user is a flowback human operator.

5. The method of claim 1,
    wherein the first user credential is card scan information.

6. The method of claim 1, further comprising:
    obtaining, by the well valve manager and from a second camera device, second image data regarding a second predetermined valve area at the well, wherein the second predetermined valve area is a flaring area that comprises a flare device and a second predetermined valve;
    determining, automatically by the well valve manager, whether any well personnel are located within the second predetermined valve area; and
    transmitting, by the well valve manager in response to obtaining a request to to open the second predetermined valve and determining that at least one well personnel is located in the second predetermined valve area, a notification to a second user device that the second predetermined valve area cannot be opened.

7. The method of claim 1, further comprising:
    determining, by the well valve manager, that a second control system is undergoing an emergency based on second well operation data; and
    determining, automatically by the well valve manager in response to the emergency, that one or more users can operate one or more predetermined valves without corresponding user credentials.

8. A system, comprising:
    a plurality of control systems at a well comprising a wellbore, wherein the plurality of control systems comprise a first control system, a second control system, and a third control system;
    a workstring configured to be disposed in the wellbore and a first predetermined valve area;
    a first camera device disposed in the first predetermined valve area comprising a first predetermined valve;
    a well network;
    a first user device; and
    a well valve manager comprising a computer processor and coupled to the plurality of control systems, the first camera device, and the first user device over the well network, wherein the well valve manager is configured to perform a method comprising:
        obtaining, from the first user device and over the well network, a first user credential;

determining, using the first user credential, that a first user associated with the first user device is authorized to operate the first predetermined valve at the well;

obtaining, from the first user device, a first request to operate the first predetermined valve, wherein the first request is transmitted to the well valve manager in response to a user input within a graphical user interface at the first user device;

determining automatically whether or not any users are located within the first predetermined valve area proximate the first predetermined valve using first image data, wherein the first image data is obtained from the first camera device in the first predetermined valve area;

determining automatically whether or not an obstacle is present inside the first predetermined valve area based on first well operation data, wherein the first well operation data is obtained by the well valve manager from the first control system performing a first well operation at the well;

determining, automatically whether or not the workstring is disposed inside the first predetermined valve area that prevents the first predetermined valve from closing based on second well operation data, wherein the second well operation data is obtained from the second control system;

transmitting, to the first user device and in response to determining that the workstring is disposed inside the first predetermined valve area, a notification that the first user cannot close the first predetermined valve, wherein the notification is displayed in the graphical user interface on the first user device; and transmitting, in response to determining that the workstring is not disposed inside the first predetermined valve area, determining that no obstacle is present inside the first predetermined valve area, and determining that that no users are located within the first predetermined valve area proximate the first predetermined valve based on the first image data, the first well operation data and the second well operation data, a command to the third control system coupled to the first predetermined valve, wherein the command causes the third control system to close the first predetermined valve.

9. The system of claim 8,
wherein the well valve manager is disposed at a cloud server outside a well site comprising the wellbore.

10. The system of claim 8, further comprising:
a user directory manager coupled to the well valve manager,
wherein the method further comprises:
obtaining, from a second user device, a second request to operate a second predetermined valve in the well;
obtaining a second user credential for a second user associated with the second user device, wherein the second user credential is transmitted to the well valve manager with the second request;
determining, using the user directory manager, whether a second user associated with a second user device is authorized to operate the second predetermined valve; and
transmitting, to the second user device, a notification that the second user cannot operate the second predetermined valve in response to determining that the second user is not authorized.

11. The system of claim 8, wherein the method further comprises:

obtaining, from a second user device associated with a second user, a second request to close a second predetermined valve in the well;

determining that a second well operation is being performed at the well based on second well operation data obtained from a second control system in real-time, wherein the second well operation uses a workstring that is disposed through the second predetermined valve in the well; and transmitting, to the second user device, a notification that the second user cannot operate the second predetermined valve in response to determining that the workstring is present inside the second predetermined valve.

12. The system of claim 8, wherein the method further comprises:

obtaining, from a second camera device, second image data regarding a second predetermined valve area at the well, wherein the second predetermined valve area is a flaring area that comprises a flare device and a second predetermined valve;

determining whether any well personnel are located within the second predetermined valve area; and transmitting, in response to obtaining a request to obtaining a request to open the second predetermined valve and determining that at least one well personnel is located in the second predetermined valve area, a notification to a second user device that the second predetermined valve area cannot be opened.

13. The system of claim 8, wherein the method further comprises:

determining that a second control system is undergoing an emergency based on second well operation data; and determining, in response to the emergency, that one or more users can operate one or more predetermined valves without corresponding user credentials.

14. A non-transitory computer readable medium storing instructions executable by a computer processor, the instructions being configured to perform a method comprising:

determining, using a first user credential, that a first user associated with a first user device is authorized to operate a first predetermined valve at a well;

obtaining, from the first user device, a first request to operate the first predetermined valve, wherein the first request is obtained in response to a user input within a graphical user interface at the first user device;

determining automatically whether or not any users are located within a first predetermined valve area proximate the first predetermined valve using first image data, wherein the first image data is obtained from a first camera device in the first predetermined valve area;

determining automatically whether or not an obstacle is present inside the first predetermined valve area based on first well operation data, wherein the first well operation data is obtained from a first control system performing a first well operation at the well;

determining, automatically whether or not a workstring is disposed inside the first predetermined valve area that prevents the first predetermined valve from closing based on second well operation data, wherein the second well operation data is obtained from a second control system;

transmitting, to the first user device and in response to determining that the workstring is disposed inside the first predetermined valve area, a notification that the first user cannot close the first predetermined valve, wherein the notification is displayed in a graphical user interface on the first user device; and transmitting, in response to determining that the workstring is not disposed inside the first predetermined valve area, determining that no obstacle is present inside the first predetermined valve area, and determining that that no users are located within the first predetermined valve area proximate the first predetermined valve based on the first image data, the first well operation data and the second well operation data, a command to a third control system coupled to the first predetermined valve, wherein the command causes the third control system to close the first predetermined valve.

15. The non-transitory computer readable medium of claim 14, wherein the method further comprises:

obtaining, from a second user device, a second request to operate a second predetermined valve in the well;

obtaining a second user credential for a second user associated with the second user device, wherein the second user credential is transmitted with the second request;

determining, using a user directory manager, whether a second user associated with a second user device is authorized to operate the second predetermined valve; and transmitting, to the second user device, a notification that the second user cannot operate the second predetermined valve in response to determining that the second user is not authorized.

16. The non-transitory computer readable medium of claim 14, wherein the method further comprises:

obtaining, from a second user device associated with a second user, a second request to close a second predetermined valve in the well;

determining that a second well operation is being performed at the well based on second well operation data obtained from a second control system in real-time, wherein the second well operation uses a workstring that is disposed through the second predetermined valve in the well; and transmitting, to the second user device, a notification that the second user cannot operate the second predetermined valve in response to determining that the workstring is present inside the second predetermined valve.

17. The non-transitory computer readable medium of claim 14, wherein the method further comprises:

obtaining, from a second camera device, second image data regarding a second predetermined valve area at the well, wherein the second predetermined valve area is a flaring area that comprises a flare device and a second predetermined valve;

determining automatically whether any well personnel are located within the second predetermined valve area; and transmitting, in response to obtaining a second request to open the second predetermined valve and determining that at least one well personnel is located in the second predetermined valve area, a notification to a second user device that the second predetermined valve area cannot be opened.

* * * * *